United States Patent
Bitzer et al.

(10) Patent No.: US 9,144,853 B2
(45) Date of Patent: Sep. 29, 2015

(54) MULTI-EDGED MACHINING TOOL FOR POST-MACHINING OF BORES

(75) Inventors: Jochen Bitzer, Albstadt-Truchtelfingen (DE); Gerd Heckel, Puschendorf (DE)

(73) Assignee: Guehring OHG, Albstadt (DE)

( * ) Notice: Subject to any disclaimer, the term of this patent is extended or adjusted under 35 U.S.C. 154(b) by 1120 days.

(21) Appl. No.: 13/107,053

(22) Filed: May 13, 2011

(65) Prior Publication Data

US 2012/0020750 A1   Jan. 26, 2012

Related U.S. Application Data

(63) Continuation of application No. PCT/DE2009/001596, filed on Nov. 13, 2009.

(30) Foreign Application Priority Data

Nov. 14, 2008 (DE) .......................... 10 2008 057 296

(51) Int. Cl.
   B23D 77/00 (2006.01)
   B23D 77/02 (2006.01)

(52) U.S. Cl.
   CPC ............ B23D 77/02 (2013.01); *B23D 2277/02* (2013.01); *B23D 2277/067* (2013.01); *B23D 2277/245* (2013.01); *B23D 2277/2464* (2013.01); *B23D 2277/46* (2013.01); *B23D 2277/52* (2013.01); *Y10T 408/44* (2015.01); *Y10T 408/81* (2015.01); *Y10T 408/906* (2015.01); *Y10T 408/9095* (2015.01)

(58) Field of Classification Search
   CPC .... B23D 77/006; B23D 77/003; B23D 77/14; B23D 2277/02; B23D 2277/205; B23D 2277/245; B23D 2277/46; Y10T 408/45; Y10T 408/892; Y10T 408/455; Y10T 408/906
   USPC ........... 408/57, 59, 224, 145, 238, 239 A, 80, 408/81, 82, 83, 227
   See application file for complete search history.

(56) References Cited

U.S. PATENT DOCUMENTS

| 4,091,525 | A | * | 5/1978 | Karasiewicz et al. ............. 407/1 |
| 5,540,526 | A | * | 7/1996 | Hyatt et al. .................... 408/1 R |
| 6,254,319 | B1 | | 7/2001 | Maier et al. |

(Continued)

FOREIGN PATENT DOCUMENTS

| DE | 197 19 893 | 11/1998 |
| JP | 52-131293 | 11/1977 |

(Continued)

*Primary Examiner* — Daniel Howell
*Assistant Examiner* — Nicole N Ramos
(74) *Attorney, Agent, or Firm* — Burr & Brown, PLLC

(57) ABSTRACT

The invention relates to a multi-edged machining tool for the post-machining or precision machining of bores. The tool has at least one cutting insert with a pre-determined nominal diameter measurement and with cutting edges that are distributed substantially uniformly around the periphery, in addition to a guide body assembly that is axially offset in relation to said edges. The guide body assembly can be an integral component of a substantially cylindrical guide body that consists of a solid carbide. In some embodiments, said guide body forms at least n helical guide ribs which are equidistant around the periphery and which have a nominal diameter substantially smaller than the nominal diameter measurement of the cutting insert by a value equating to double the dimension of the lubricant gap that is formed during the operation of the tool.

24 Claims, 6 Drawing Sheets

(56) References Cited

U.S. PATENT DOCUMENTS

| | | | |
|---|---|---|---|
| 6,280,126 B1* | 8/2001 | Slocum et al. | 409/141 |
| 6,575,672 B1* | 6/2003 | Maier | 408/59 |
| 7,770,276 B2* | 8/2010 | Christ et al. | 29/90.01 |
| 2010/0061820 A1* | 3/2010 | Haimer | 408/143 |
| 2010/0104385 A1* | 4/2010 | Nomura et al. | 408/83 |

FOREIGN PATENT DOCUMENTS

| | | |
|---|---|---|
| JP | 56-028824 | 3/1981 |
| JP | 59-055624 | 4/1984 |
| JP | 01-310816 | 12/1989 |
| JP | 2001-310205 | 11/2001 |
| JP | 2004141982 A * | 5/2004 |

* cited by examiner

MULTI-EDGED MACHINING TOOL FOR POST-MACHINING OF BORES

The invention relates to a multi-edged machining tool for post machining or precision machining of bores, in particular configured as a reamer, according to the preamble of Patent Claim 1.

Such tools are needed if it is necessary to machine bores which are situated particularly deeply in the workpiece or a plurality of axially separated bores of the same dimensions and quality in a high-precision manner in a single pass. Specifically, such bores are needed in what are known as bearing tunnels, which are used either for accommodating the bearing bushings or for forming the bearing points of the crankshaft in the cylinder head of an internal combustion engine. Such a machining tool for precision machining of bores can in such a case easily have a shank length of over 400 mm, it being possible for the smallest nominal diameter of the cutting edge set to be in the order of magnitude of approximately 20 mm.

As the bores of the bearing tunnel not only have very small tolerances in diameter, but also have a positional assignment with very low tolerances, there is particular difficulty when designing the relevant machining tools for post-machining of bores in that the stability of the tool must be kept high with reasonable expense in such a manner that the positional tolerances demanded by the manufacturer can be maintained even after a long tool life travel. It must be taken into consideration that both the diameter tolerances and the cylinder positional tolerances of the bores to be produced are in the $\mu m$ range.

There are various approaches to stabilising such tools. It is for example customary to stabilise the cutting edges, which are often distributed uniformly over the circumference of the tool with guide strips situated therebetween. Such a tool is for example described in DE 197 19 893 A1.

With this structure of the reamer, it is however not possible to produce machining surfaces situated far away from each other with the above-described high precision and dimensional accuracy. Furthermore, the disadvantage has been found in such a known structure that the guide strips considerably reduce flexibility in the design of the tool, as they take up a relatively large amount of installation space in the circumferential direction and thus limit the number of cutting edges.

JP-2001310205 A discloses a tool according to the preamble of Patent Claim 1 in which straight guide strips which are uniformly distributed over the circumference are embedded in the tool shank, wherein the guide strips extend at last partially away from the tip of the tool in the cutting edge region. The guide strips consist of hard metal, i.e. of a material which is harder than the steel of the support material. To keep the stability of the tool sufficiently high, the shank of the tool is thicker in the vicinity of the chucking point than in the region of the tool tip.

The production of such a precision machining tool is however relatively complex. The guide bodies must be soldered into corresponding recesses in the tool shank in a precisely fitting manner and then ground to fit exactly. A particular disadvantage of these known tools consists however in that the field of application of a tool constructed in this manner is restricted to isolated cases. In other words, a tool constructed in this manner can only be used for a very specific cutting job, i.e. for the production of a very specific bore of a very specific depth.

The invention is therefore based on the object of providing a preferably rotary-driven, multi-edged machining tool for post-machining deep bores or a plurality of axially separated bores of the same dimensions and quality, with which it is possible to produce bores which are situated axially relatively deeply in the workpiece or a plurality of axially separated bores of the same dimensions and quality with a high level of precision, dimensional accuracy and surface quality, wherein the structure should be such that maximum flexibility is ensured with respect to the adaptation of the tool to different bore geometries (depth and diameter).

This object is achieved by the features of Patent Claim 1.

According to the invention, the guide body arrangement becomes an integral component of a separate components consisting of a hard material, in particular solid carbide (SC), which forms the bridge between the cutting edge set at the tip of the tool and the shank in the vicinity of the chucking point. The plurality of helical guide ribs at a uniform circumferential distance from each other not only ensures excellent guiding of the tool, even with very deep bores, but also provides the particular additional advantage that the guide body becomes a modular component of the tool for post-machining bores. This has the advantage that the guide body can be selected individually to adapt to the current cutting task and assembled with the customary components of the tool made precisely for the cutting task. The tool can be produced substantially more cost-effectively in this manner.

It is of particular additional advantage that the formation of the guide body from solid carbide gives the tool additional stability, which, together with the guide ribs running at least once through 360° in total, ensures that the cutting edge set of the tool works with maximum precision. Owing to the helical profile of the guide ribs, the tool has continuous support in all directions so that the cutting force of each cutting edge counteracts a corresponding supporting moment.

Advantageous developments form the subject matter of the dependent claims.

It has been found that maximum stability can be achieved if the guide body is connected in a non-rotatable and non-displaceable manner on one side to a first cutting edge module which bears the cutting edge set and on the other side with a shank part, preferably by shrink-fitting. This connection furthermore has the advantage that it is self-centring, so that extensive post-machining of the guide body and/or of the cutting edge set after the components are joined can be omitted.

The guiding of the tool can be further improved by the measures of Claim 3. In this case, a specially designed guide strip set is used, which is arranged behind the cutting edge set as seen in the feed direction and is formed by cutting inserts which are in each case axially aligned with the cutting edges of the cutting edge set which is adjacent in the feed direction of the tool.

The cutting inserts of the guide strip set, which are preferably ground cylindrically, have a nominal diameter which is in the $\frac{1}{1000}$ range smaller than the nominal diameter of the cutting edge set which is adjacent in the feed direction. This difference in nominal dimensions lies in the order of magnitude of the doubled lubrication gap to the bore wall just machined by the upstream cutting edge set, which gap is formed during use of the tool. In other words, the nominal diameter of the guide strip set corresponds essentially to the nominal diameter which is assigned to the helical guide ribs of the guide body, so that a lubrication gap in the range between 5 and 9 $\mu m$ is produced in the region of the guide strip set. This lubrication gap measure can be reliably filled by a lubricant film of a customary coolant/lubricant used in reaming, so that the guide strip set and the guide body can effectively be used to stabilise the tool in any work phase via the helical guide ribs.

Because the cutting inserts of the guide strip set, which are positioned in a highly precise manner, align axially with the cutting edges of the cutting edge set which is adjacent in the feed direction of the tool, but are axially offset with respect to these cutting edges, the guide strip set has no influence at all on the number of cutting edges used in the region of the cutting edge set. In other words, the number of cutting edges in the region of the cutting edge set can easily be increased, which further benefits flexibility during design of the tool with adaptation to the respective cutting task.

In particular if the cutting edge set is provided with an even number of cutting edges, and these cutting edges are distributed essentially uniformly over the circumference, the particular advantage is produced that a cutting insert of the guide strip set always lies essentially diametrically opposite a cutting edge of the cutting edge set which is adjacent in the feed direction. In this manner, particularly efficient guiding of the cutting edges of the cutting edge set can be realised. Furthermore, the cutting inserts of the guide strip set save a lot of space and can essentially be built in the same manner as the cutting edges of the cutting edge sets which are adjacent in the feed direction, which further simplifies the production of the tool.

It has been found that the setting of the nominal diameter of the guide ribs and/or of the guide strip set to values according to Claim 4 results in particularly good results, if coolant/lubricant with conventional parameters (with regard to consistency, density, speed and pressure) is supplied. The differential measure of the nominal diameter can vary depending on whether wet or dry machining (MQL technology) is selected, and as a function of the pressure of the coolant/lubricant used. For a nominal diameter of the cutting edge set of for example 23 mm, the measure of the nominal diameter difference can be between approximately 11 and 17 µm.

A particularly good stabilisation effect of the guide strip set, i.e. particularly good guiding, is produced by the development of Claim 5. Experiments have shown that it is simply sufficient to restrict the axial length of the cutting inserts of the guide strip set to the length of the adjacent cutting edge set. If the structural conditions allow, however, it is of course possible to increase the axial length of the guide strip set beyond the length of the cutting edge set in front of it, in order to further increase the stabilising effect in this manner.

As already discussed above, the structure of the tool for post-machining bores according to the invention advantageously provides the possibility of composing the tool in a modular manner. With the development of Claim 6, an expansion of the possibilities for use of tool is produced in a simple manner without making the tool more expensive overall. With this structure it is possible to assemble a tool for a wide variety of applications with low outlay on equipment. It is even possible to connect the cutting edge module, which is connected in a non-rotatable and non-displaceable manner to the guide body, detachably to the further cutting edge module, as the lubrication-gap-protected support of the cutting edge set ensures sufficient stabilisation.

Advantageously, the cutting inserts of the guide strip set and/or at least one of the otherwise present cutting edge sets are formed from cutting plates which have a PCD (polycrystalline diamond) layer. Such PCD-equipped cutting plates can be shaped extremely accurately, are extremely stable and take up a relatively small amount of space, in particular if they are soldered directly to a support material. It has surprisingly been found that these PCD-equipped cutting plates are also very well suited to functioning in the region of the guide strip set, even though they have a thickness in only the mm range.

If the cutting inserts of the guide strip set and/or at least one of the cutting edge sets present are aligned with parallel axes, further simplifications of the production of the tool result. It should however be emphasised that the tool does not necessarily have to have straight grooves. Rather, it can also be equipped with cutting edges in the region of the cutting edge sets and of the guide strip set which are at least slightly positively or negatively twisted or directed towards the axis of the tool.

As already discussed above, the helical guide ribs, together with the coolant/lubricant, contribute substantially to the stabilisation of the tool and thus to straight guiding. The same applies to the stabilising effect of the guide strip set.

The stabilising effect of the coolant/lubricant can be designed particularly effectively if there is an internal coolant/lubricant supply. In this manner it is ensured that the critical regions of the tool are supplied continuously and sufficiently with coolant/lubricant, so that the lubricating film necessary for stabilisation does not come off. Such an internal coolant/lubricant supply is advantageous in particular in dry machining, i.e. if MQL (minimum quantity lubrication) technology is used.

Each guide rib or, if present, each cutting edge set is advantageously assigned a sufficient number of openings for supply with coolant/lubricant. The number and position of the openings is advantageously determined empirically and advantageously adapted to the type of coolant/lubricant and the process parameters (lubricant density, lubricant volumetric flow etc.).

In order that the tool for post-machining bores remains sufficiently stable even when machining outwardly lying bores in the workpiece, it is advantageous to form the chucking section for centred coupling of the tool according to Claim 13. The tool can additionally be axially stabilised, i.e. centred, by means of the chucking flange, which is produced with a small run-out tolerance with respect to the tool axis.

With the development of Claim 15, the stabilising effect of the guide body described at the start is further optimised. It has been found that particularly good results are achieved with four guide ribs which extend in each case over a centring or wrap angle of 360°.

Further advantageous configurations form the subject matter of the remaining dependent claims.

An exemplary embodiment of the invention is explained in more detail below with the aid of schematic drawings, In the figures.

Figure 1:
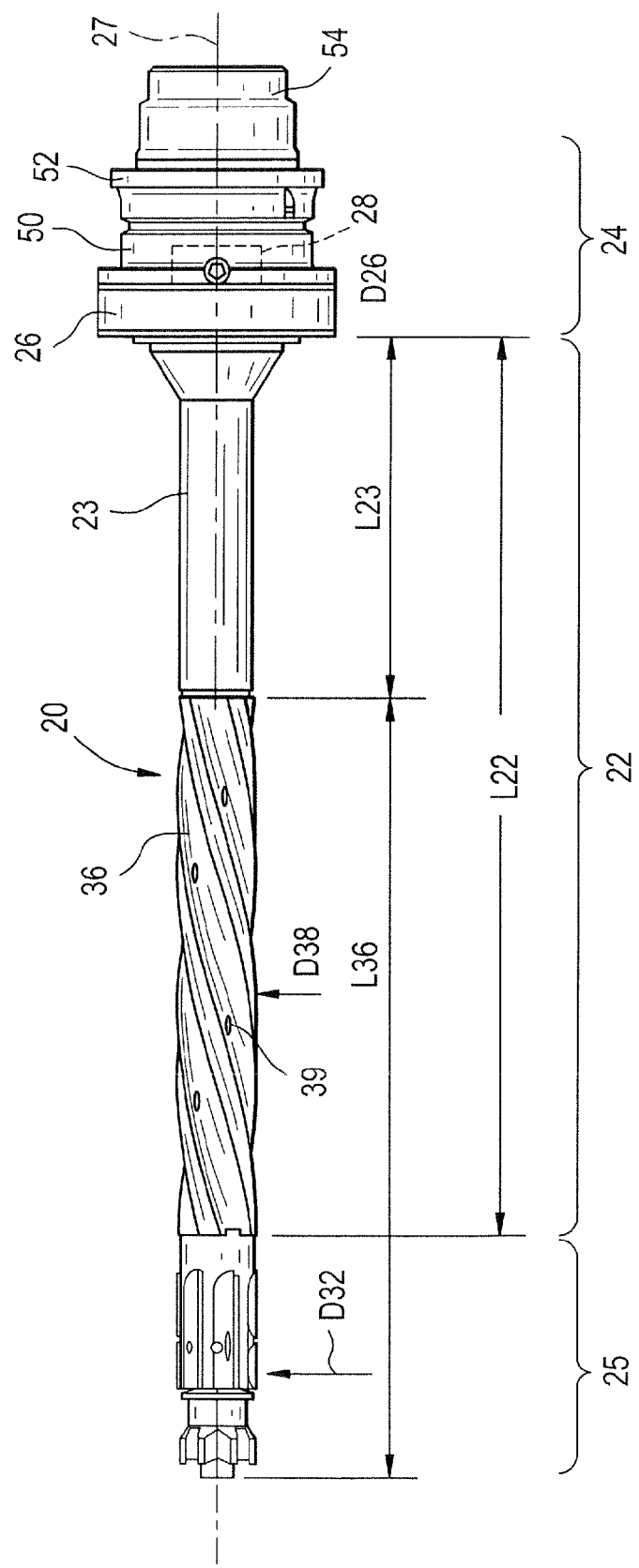
FIG. 1 shows a side view of an embodiment of a multi-edged machining tool for post-machining of bores.

In FIG. 1, the reference symbol 20 refers to a multi-edged, rotary-driven machining tool for post-machining bores in a configuration as a reamer, which in the present case is used as a "bearing tunnel tool". Such a tool is used in the automotive industry when it is necessary to machine the bores for the bearings of a crankshaft of an internal combustion engine to their final dimensions. In such a case a tool is therefore needed which is able to produce the individual cylindrical effective faces of the bearings with the highest possible level of axial alignment, accuracy and surface quality while maintaining small tolerances. The tool mainly has three sections, namely a shank 22, a chucking section 24 and a cutting part 25.

The tool shown has for example a nominal diameter of approximately 23 mm. For an actual cutting task in the production of what is known as the "bearing tunnel", a cutting part length of approximately 75 mm and a shank length L22 of approximately 300 mm are needed. The chucking section 24 has as the essential component a chucking flange 26, which has a sufficiently large diameter D26 to form a large planar face for bracing the tool 20 to a tool system module.

In the exemplary embodiment shown, the chucking flange 26 has for example an outer diameter of approximately 70 mm. The planar face is manufactured with very high running accuracy with respect to the tool axis 27 or with respect to a centring projection 28, which is shown with dashed lines and is formed for example by a centring cylinder or else by a centring cone, in particular a hollow shank taper (HST) cone. In the exemplary embodiment shown, the chucking flange 26 is attached to an equalisation adapter 50, which bears a coolant transfer set (not shown in detail) and for its part bears a chucking flange 52 with a hollow shank taper (HST) 54, by means of which the tool can be attached to a spindle or another tool system module.

The tool shown in FIG. 1 therefore has a modular construction, so that it can be adapted quickly and optimally to the respective production lines of the engine production operation. Flexibility with regard to the cutting technology used is also ensured. For example, it is possible to adapt the type of cooling/lubrication, for example to change from wet to "dry" machining (MQL technology) by means of the equalisation adapter 50 (MQL means minimum quantity lubrication).

The chucking point of the tool, the shank and the cutting part are sufficiently rigid for the tool to be able to machine the outer bearing bores of the workpiece as precisely as possible. If the tool is moved deeper into the workpiece, special additional precautions are taken to keep the accuracy of the bore as well as the surface quality thereof at the highest possible level. These measures are explained in more detail below.

Behind the cutting part 25, the structure of which is explained below, an essentially cylindrical guide body 36 is arranged which consists of hard material, in particular of solid carbide (SC) and is connected in a rotationally and axially fixed manner to a shank section 23 on one side and to the cutting part 25 on the other side. To this end, the guide body preferably has at both axial ends thereof a centring cylinder, by means of which a shrink fit connection to the components of the tool consisting of tool steel is produced, i.e. to the shank butt 23 and to the cutting part 25 (see centring bore 29 in FIG. 2).

In the guide body 36, at least two helical grooves are formed, between which two helical guide ribs 38 are produced which are at a uniform circumferential distance from each other and are preferably ground cylindrically to a nominal diameter D38. This nominal diameter is essentially smaller by twice the size of a lubrication gap which is formed during use of the tool than the nominal diameter D32 of a cutting edge set 32 which is adjacent in the feed direction and performs the finishing of the bearing tunnel bore. In the exemplary embodiment shown, the nominal diameter of the cutting edge set 32 is set at approximately 23 mm, the dimensional tolerance being 0 to −3 μm. The nominal diameter D38 of the guide ribs is in this case smaller by approximately 14±3 μm. This difference in nominal diameter is therefore precisely the size for a stable lubrication gap to be formed with a predefined coolant/lubricant supply state between the outer surface of the guide ribs 38 and the inner walls of the bearing tunnel bore just machined by the cutting edge set 32, by means of which the tool 20 is guided in an axis-precise and vibration-free manner over the entire circumference.

In the exemplary embodiment shown, four helical guide ribs 38-1 to 38-4 are provided, which are at a uniform distance from each other. Each of these guide ribs 38-1 to 38-4 runs through a sufficiently large wrap or centring angle which is at least greater than 360°/n, where n means the number of guide ribs 38-1 to 38-4. In the exemplary embodiment shown, the centring angle through which the individual guide ribs 38-1 to 38-4 run is in each case 360°, so that particularly effective support and therefore straight guiding of the tool can be achieved.

As indicated above, the tool is equipped with an internal coolant/lubricant supply, so that a preferably central recess for the supply of the coolant/lubricant is present in the interior of the shank, i.e. in the interior of the shank butt 23 as well as in the interior of the guide body 36 and in the interior of the cutting part 25. Reference symbol 39 refers to openings of branch channels which lead preferably obliquely to the axis 27 from the internal coolant recess to the relevant grooves of the guide body 36 and emerge there in an axially staggered manner between the guide ribs 38-1 to 38-4. Coolant/lubricant at sufficient pressure and with correspondingly optimised consistency (density, oil content, oil droplet size, etc.) passes via the openings 39—preferably in an empirically determined manner—into the space between the guide body and the inner walls of the bore so that the continuous lubricant gap can be supplied optimally for stabilising the tool.

The configuration of the cutting part 25 is explained in more detail below with reference to FIGS. 2 to 6. As can be seen most clearly in FIG. 2, the cutting part 25 consists in detail of two modules, a first cutting edge module 42 and a second cutting edge module 44 which is adjacent thereto in the axis direction. The first cutting edge module 42 has a diametric rib 43 on the side facing the guide body 36, by means of which rib a rotationally fixed fitting tooth system with a corresponding diametric groove can be produced in the guide body 36. In the centre of the cutting edge module 42, the diametric rib 43 is removed by the introduced fitting bore 29, which is indicated by dashed lines. The shrink fitting takes place by means of the fitting bore 29 onto a complementary cylindrical projection (not shown in detail) of the guide body 36.

The first cutting edge module 42 bears a cutting edge set 32, which in the exemplary embodiment is formed by six cutting inserts 32-1, 32-2, 32-3, 32-4 and (not shown) 32-5 and 32-6 which are distributed uniformly over the circumference. It should however be emphasised at this point that the number of cutting edges or cutting inserts is not limited to six.

The cutting edges or cutting inserts 32-1 to 32-n are aligned axially and have a length L32 in the range between 13 and 17 mm. They are for example formed from PCD (polycrystalline diamond)-plated cutting plates, in which a steel carrier part of approximately 0.5 to 1 mm thickness bears a PCD layer of approximately 0.5 mm. The cutting edges of the cutting edge set 32 are ground according to customary criteria, so a description of the details can in this case be omitted.

Figure 2:
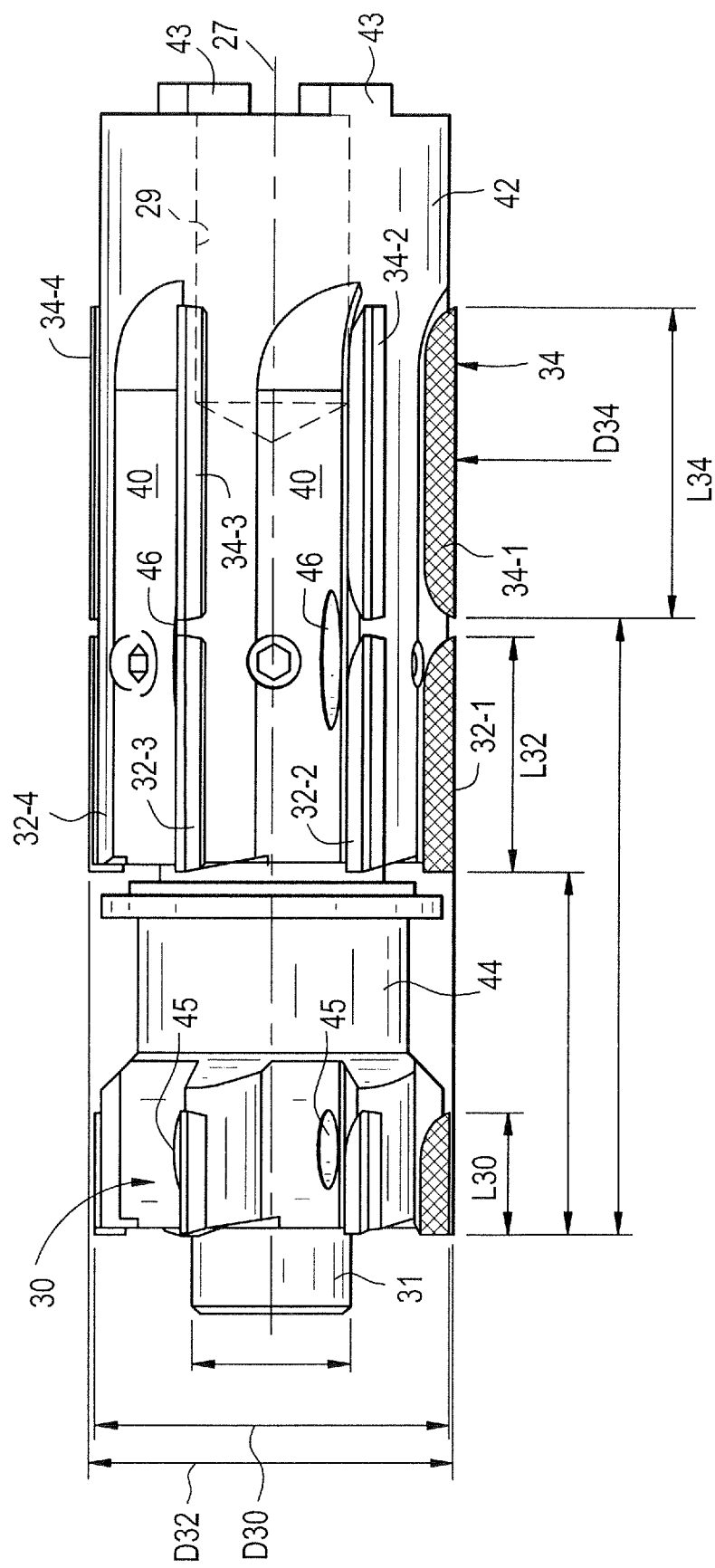
FIG. 2 shows a part module of the tool shown in FIG. 1 on an enlarged scale.
Figure 3:
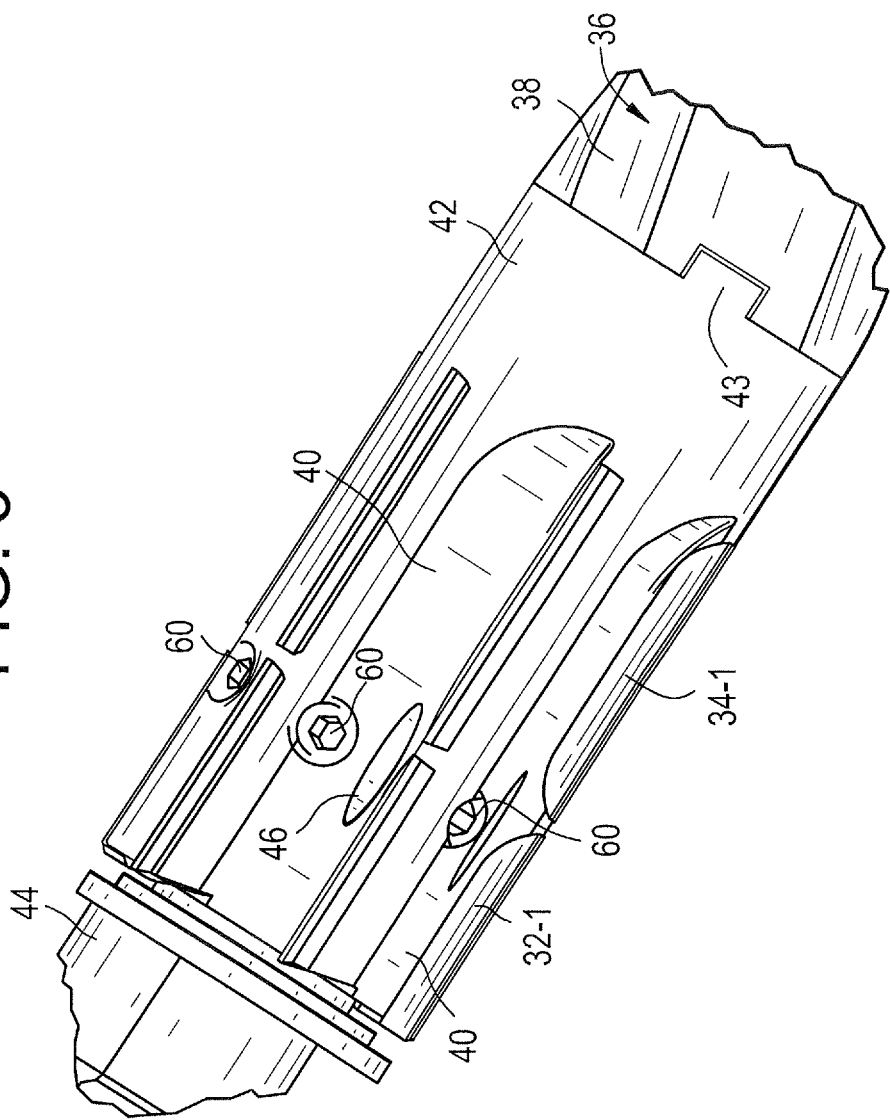
FIG. 3 shows a detail of a tool module of the tool according to FIGS. 1 and 2 on a slightly enlarged scale.

The special feature of the first cutting edge module 42 according to FIG. 2 however consists in that a supporting strip set 34 which is formed by a plurality of supporting strips 34-1 to 34-6 is assigned axially adjacently to the cutting edge set 32, i.e. at a distance of a few mm. These supporting strips 34-1 to 34-6 are also formed as highly precisely positioned, preferably cylindrically ground cutting inserts which are in each case axially aligned with the cutting edges 32-1 to 32-6 of the cutting edge set 32 which is adjacent in the feed direction of the tool. The supporting strip set 34 is ground in such a manner, preferably cylindrically, that the outer surface or the outermost radial edges lie on a nominal diameter which is essentially smaller by twice the size of a lubrication gap which is formed during use of the tool than the nominal diameter D32 of the cutting edge set 32 which is adjacent in the feed direction. In other words, the measure D34 lies in the order of magnitude of the diameter D38, so that the supporting strips 34-1 to 34-6 which are closely adjacent to the cutting edge set 32 are used to stabilise the engaged cutting edge set 32.

The axial length L34 of the supporting strip set 34 is slightly greater than the axial length L32 of the cutting edge set 32, it is therefore in the range between 15 and 25 mm. The cutting inserts 34-1 to 34-6 are constructed in a similar manner to the cutting inserts 32-1 to 32-6, i.e. likewise formed from PCD-plated cutting plates which have a total thickness of approximately 1 to 1.5 mm.

As can be seen in FIG. 2, the cutting inserts of the cutting edge set 32 and of the supporting strip set 34, which are in each case aligned axially with each other, are in a common pocket 40 which is formed in the first cutting edge module 42. The cutting inserts 32-1 to 32-6 and 34-1 to 34-6 are accommodated in the pocket 40 in such a manner that the relevant secondary cutting edges of the tool essentially lie in a plane running through the tool axis 27.

As already discussed above, the cutting inserts of the supporting strip set 34 are preferably ground cylindrically on the outer circumference. It should however be emphasised that it is equally possible to grind the cutting inserts 34-1 to 34-$n$ in a blade-like manner or in such a manner that a negative secondary cutting edge free angle is produced. The only critical thing is that the positioning of the cutting inserts 34-1 to 34-$n$ and the machining or shaping thereof is so precise that a homogeneous lubrication gap is produced over the entire length L34, by means of which the tool can additionally and effectively be guided.

The cutting edge set 32, like the supporting strip set 34, is therefore equipped with in each case six cutting edges or cutting edge-like bodies, which are at a distance from each other of in each case 60°. As the cutting inserts 34-1 to 34-$n$ of the supporting strip set 34 are axially aligned with the cutting edges of the adjacent cutting edge set 32, each cutting edge of the cutting edge set lies diametrically and slightly offset to a stabilising lubrication gap of the supporting strip set 34, so that deviating movements of the tool caused by cutting force can be effectively counteracted.

As can further be seen from FIG. 2, the first cutting edge module 42 bears the second cutting edge module 44, for example by means of an internal thread (which is however not shown in FIG. 5), which second module is screwed with the threaded projection thereof (likewise not shown in detail) into the first cutting edge module 42. At the front end the second cutting edge module 44 bears a further cutting edge set 30, which has a nominal outer diameter referred to with. This nominal diameter D30 is smaller than the nominal diameter D32 of the tool and is approximately 22.5 mm in the exemplary embodiment shown. This cutting edge set 30 can in turn be equipped with cutting inserts 30-1 to 30-$n$ which are aligned axially with the cutting edges of the cutting edge set 32.

In the exemplary embodiment shown, the cutting edge set 30 is used for pre-machining the bearing tunnel bores. To this end, the nominal diameter of the cutting edge set 30 is kept approximately 0.5 mm smaller than the nominal diameter of the cutting edge set 32. It is however equally possible to machine a stepped bore of smaller diameter with the cutting edge set 30. Reference symbol 31 refers to a component with which the cutting edge set 30 is secured axially to the second cutting edge module 44 and/or the inner recess of the tool for supplying coolant is closed. The rotationally fixed connection between the second cutting edge module 44 and the cutting edge set 30 is created either by integral formation or by a form-fitting toothed connection of the components.

As already discussed above, the tool 20 is equipped with an internal coolant/lubricant supply, which provides a sufficient supply of coolant/lubricant to the cutting edges and guide ribs in use via a preferably central channel. The central supply channel provided in the interior of the tool 20 extends through the interfaces between the guide body 36, the first cutting edge module 42 and the second cutting edge module 44. The internal channel is then closed by means of the component 31.

Reference symbols 45 and 46 refer to openings of branch channels which preferably run obliquely to the axis 27 of the tool and branch off from the internal coolant/lubricant recess. As can be seen, the opening 46 is arranged in the region of the cutting edge set 32 in such a manner that it lies in the vicinity of the supporting strip set 34, so that this opening can be used to supply the cutting edges of both the cutting edge set 32 and the supporting edge set 34.

60 refers to threaded pins which can be radially screwed into the first cutting edge module 42 and with which balancing or fine balancing of the tool can be performed.

As can further be seen in the illustrations of FIGS. 1 and 2, the functional faces, i.e. the outer diameter of the cutting edge set 30, of the cutting edge set 32, of the supporting strip set 34 and of the guide body 36 or of the guide ribs 38 are manufactured with maximum precision and positioning to the tool axis 27. The nominal diameter of the cutting edge set 32, of the supporting strip set 34 and of the guide body 36 are manufactured in the tolerance range of 0 to −3 μm. The manufacturing tolerance of the nominal diameter of the cutting edge set 30 is ±20 μm. The running accuracy of the cutting edge set 30 with respect to the chucking face of the chucking flange 52 on one side and with respect to the axis 27 or the chucking cone of the hollow shank taper (HST) 54 is 5 μm. This running accuracy is reduced to as low as 3 μm with respect to the cutting edge set 32, the supporting strip set 34 and the supporting body.

Accordingly, it is clear from the above description that the tool according to the invention is able to produce the inner bore of a bearing tunnel or very deep coaxial bores with maximum precision, positional accuracy and good surface quality. Because the guide body 36 forms the guide ribs 38 as an integral component of a tool module, there is the production advantage that complex guide strips do not need to be used. At the same time, great flexibility is ensured during design of the tool or during the adaptation thereof to the respective cutting task. The axial length L22 of the tool shank 22 can be set by changing the guide body 36 without it being necessary for the tool to be recreated in the region of the cutting edge set 32 and/or in the region of the cutting edge set 30. The tool structure can likewise be retained in the region of the chucking point 26 and of the shank butt 23, as a result of which further advantages are given during production of the tool.

The tool has a device for fine balancing. In addition to the threaded pins 60 in the region of the first cutting edge module 42, similar axial and/or radial threaded pins are provided in the region of the chucking flange 26, the positioning of which makes dynamic fine balancing of the tool possible.

The dimensions of the tool can of course be varied within wide limits. The dimensions of the configuration according to FIGS. 1 and 2 are merely by way of example. For example, the axial dimension L44 of the second cutting edge module 44 can of course be greater or smaller than the dimension of approximately 20 to 25 mm shown in the exemplary embodiment.

The definition of the nominal diameter D34 or D38 can also be varied depending on the pressure and the physical parameters of the coolant/lubricant used. In the exemplary embodiment shown, the nominal diameter difference is for example between 11 and 17 µm. This nominal diameter difference can be even greater for wet machining.

Figure 5:
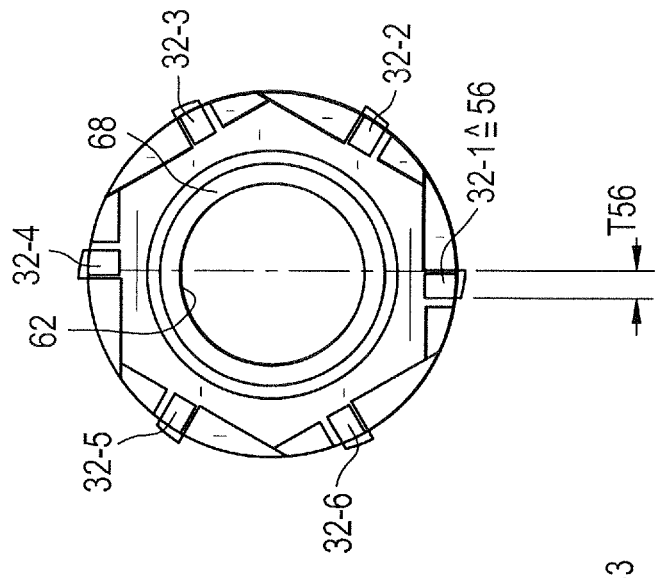
FIG. 5 shows the view according to "V" in FIG. 4.
Figure 4:
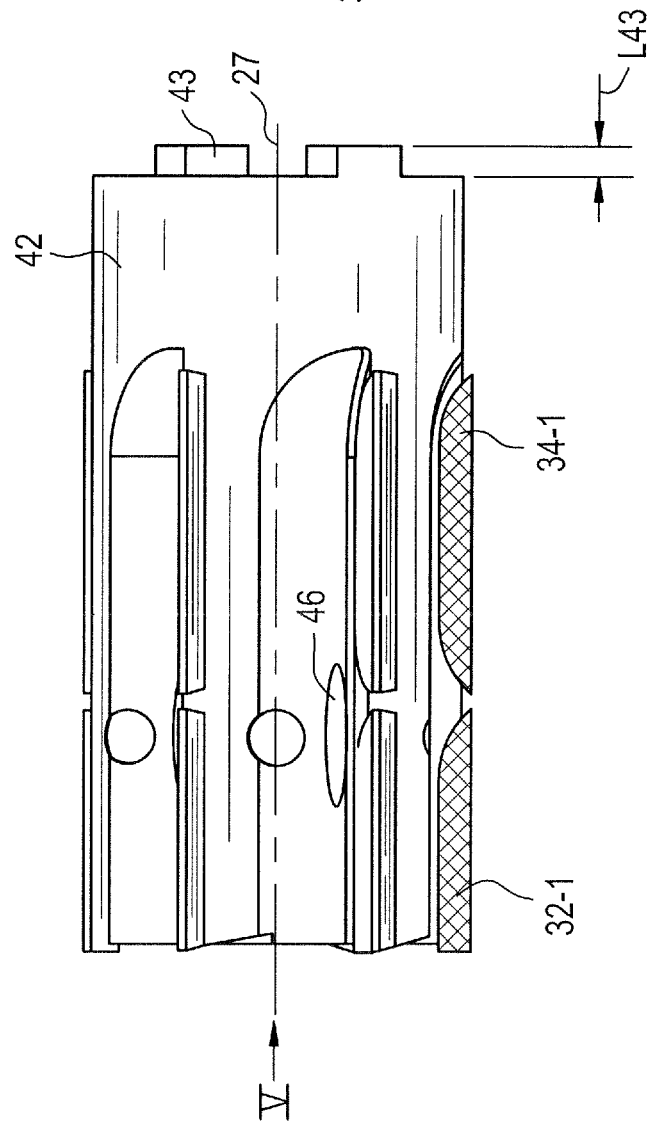
FIG. 4 shows a side view of a part module of the component according to FIG. 2.
Figure 6:
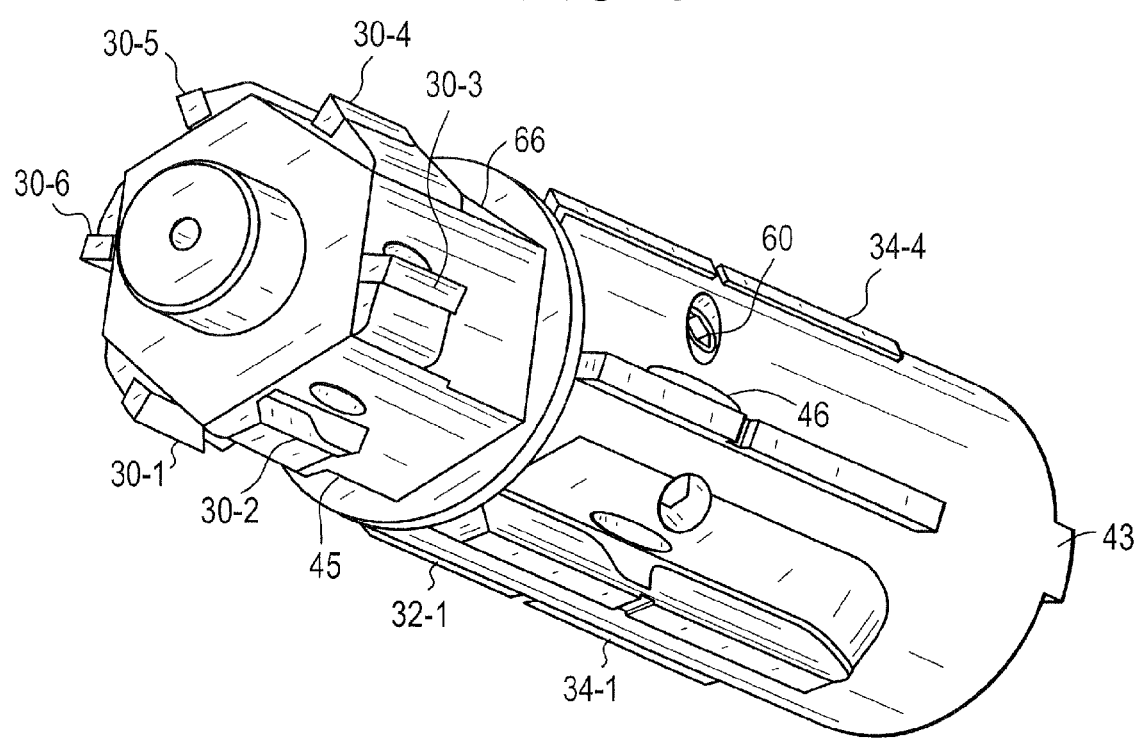
FIG. 6 shows a perspective view of the tool module according to FIG. 2.

FIGS. 4 and 5 show details of the first cutting edge module 42. It can be seen that the cutting inserts 32-1 to 32-6 of the cutting edge set 32 have a chamfer of 0.1×45°. This applies correspondingly to the cutting inserts of the supporting strip set 34. In this region, the cutting inserts 34-1 to 34-6 at the previous end in the feed direction are designed with an insertion chamfer with the dimensions 0.15 mm×15°. The axial dimension L43 of the dog rib 43 is defined with approximately 2 mm in the variant according to FIG. 4.

The side view according to FIG. 5 shows how the cutting inserts 32-1 to 32-6 come to lie with respect to the tool axis 27. It can be seen that the secondary cutting edges of the cutting inserts 32-1 to 32-6 lie in front of the centre by approximately 0.1 mm. It can furthermore be seen that the cutting inserts have a PCD layer in the order of magnitude of approximately 0.5 mm and a cylindrical grinding chamfer of 0.5. The segment thickness is specified as 1.6 mm. It can however be selected to be as low as 1 mm.

While tool steel is preferably used for the components of the chucking section, the shank butt and the cutting edge modules, a heat-treatable steel such as 50CrV4 is advantageously used as the material for the carrier plate of the cutting inserts.

Reference symbol 62 refers to an inner thread in FIG. 5, into which the second cutting edge module 44 can be screwed. The screw thread of the second cutting edge module has an outer cone in the transition region to the cutting part, which outer cone can be supported on a counter fitting face 68 of the first cutting edge module 42 when screwed in. The cutting edges 32-1 to 32-6 can therefore be radially fine-adjusted by means of the pairing of conical faces. To this end, the second cutting edge module 44 is provided with flattened portions 66 to form a width across flats.

Figure 7:
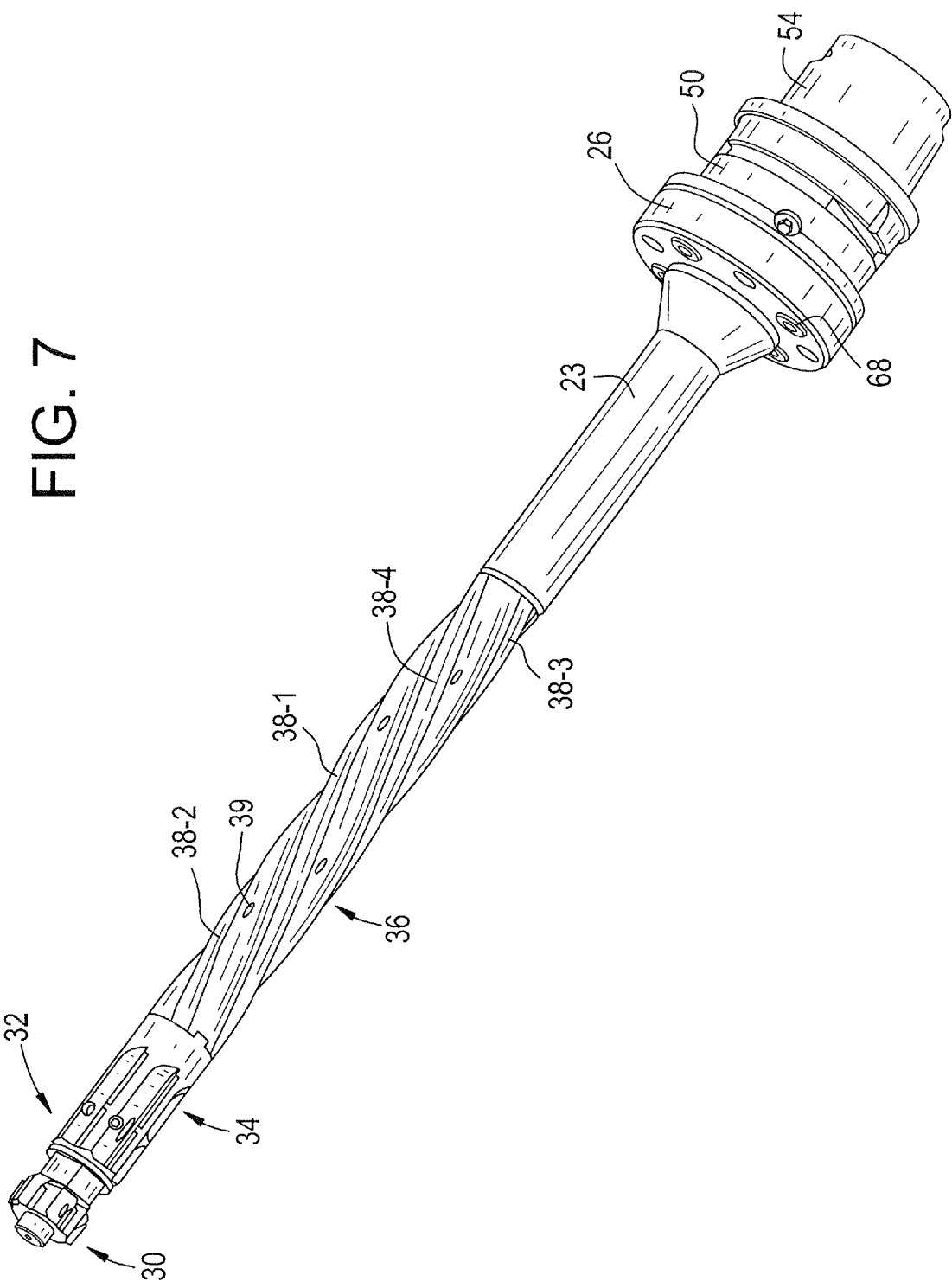
FIG. 7 shows a perspective view of the whole tool.

FIG. 7 shows the tool fully assembled in a perspective view. Components corresponding to the above-described components are in this case provided with corresponding reference symbols. Axial threaded pins 68, by means of which an additional balancing option is provided, can also be seen in the chucking flange 26.

Of course, deviations from the described exemplary embodiment are possible without departing from the basic idea of the invention.

For example, the essentially axial alignment between the cutting edges of the cutting edge set 32 and the supporting strip set 34 can also be retained if the cutting edges are configured with a slight left or right twist, i.e. if the front rake angle of the secondary cutting edges preferably deviates slightly from 0°. Instead of the straight grooves of the tool, the pockets 40 are then also aligned slightly positively or negatively with respect to the axis 27.

The cutting edge sets 30 and 32 are likewise not necessarily constructed in such a manner that the cutting edges are formed on cutting inserts. The cutting edges can also be formed integrally with a cutting edge carrier, which then preferably consists of a hard material such as solid carbide.

Other materials, in particular also different materials, can also be used as materials for the first and second cutting edge modules.

It was described above that the supporting strips 34-1 to 34-6 are cylindrically ground. The ground section can however also be modified so that a widening of the lubrication gap is produced in the direction of rotation of the tool.

This applies correspondingly to the outer surface of the guide ribs 38-1 to 38-4.

The ground section of the cutting inserts of the cutting edge sets 30 and 32 has not been described in detail. Customary ground sections which are generally used in high-performance reamers can be used here, for which reason a detailed description thereof can be omitted in this case. It can however be advantageous for example for the PCD-plated cutting inserts to taper slightly in diameter over the length in the axial direction, in the $\frac{1}{1000}$ range, for example by up to 12 to 16 µm. It is also advantageous to round the PCD-plated cutting inserts at the edges or to provide them with a round chamfer.

Instead of assigning each cutting edge of the cutting edge sets with its own opening of the coolant/lubricant supply, it can also be sufficient in isolated cases to supply a plurality of cutting edges by means of one opening.

It is of course also possible to vary the number of cutting edges and/or the number of guide ribs. It should however be ensured that the tool is supported by means of the guide body over a wide axial extent and over the entire circumference. n helical guide ribs which are at a uniform circumferential distance from each other and in each case extend over a centring angle which is greater than 360°/n are therefore advantageously present, where n≥2.

In the exemplary embodiment shown the helix of the guide ribs 38 runs in the direction of rotation. It is however equally possible to set the helix of the guide ribs 38 counter to the direction of rotation.

Instead of assigning each cutting edge of the cutting edge sets 30, 32, 34, 36 with its own opening of the coolant/lubricant supply, it can also be sufficient in isolated cases to supply a plurality of cutting edges by means of one opening.

The above-described tool for post-machining bores in the configuration as a stepped reamer has been described above as a rotary-driven tool. It is however equally possible to insert the tool vertically and carry out cutting by setting the workpiece in rotation.

The above-described tool has six cutting edges distributed uniformly over the circumference. The number of cutting edges can however vary within wide limits, but an even number of cutting edges is advantageously selected. The invention can provide the advantages described at the start even if the angular distances of the cutting edges distributed over the circumference are not exactly the same size.

An embodiment of the tool has been described above which machines only one diameter to precision. The invention can however equally be used for machining stepped bores in one pass, and still provide all the above-discussed advantages. The invention thus creates a multi-edged machining tool for post-machining or precision-machining bores, in particular a reamer, for machining deep bores or several axially separated bores of the same dimensions and quality, for example bores for accommodating bearing bushings for a camshaft. The tool has at least one cutting insert with a predefined nominal diameter and with cutting edges distributed essentially uniformly over the circumference, and a guide body arrangement offset axially thereto. To improve the guiding accuracy while at the same time providing great flexibility when adapting the tool to the respective cutting task, the guide body arrangement is an integral component of an essentially cylindrical guide body consisting of solid carbide (SC). This guide body forms at least n helical guide ribs which are at a uniform circumferential distance from each other and to which a nominal diameter is assigned which is essentially smaller than the nominal diameter of the cutting edge set by twice the size of a lubrication gap which is formed during use of the tool. Each guide rib extends beyond a centring angle which is greater than 360°/n, where n≥2.

The invention claimed is:

1. Multi-edged machining tool for post-machining or precision machining of bores, for machining deep bores, a plurality of axially separated bores of the same dimensions and quality, or bores for accommodating bearing bushings for a camshaft, the tool comprising:
at least one cutting edge set having a predefined nominal diameter and cutting edges distributed essentially uniformly over the circumference; and
a guide body arrangement offset axially thereto, the guide body arrangement an integral component of an essentially cylindrical guide body which consists of solid carbide and forms at least n helical guide ribs which are at a uniform circumferential distance from each other, which extend through a centring or wrap angle which is greater than 360°/n, where n≥2, and to which a nominal diameter is assigned, the nominal diameter being essentially smaller by twice the size of a lubrication gap which forms during use of the tool than the nominal diameter of the cutting edge set which is adjacent in the feed direction.

2. Machining tool for post-machining bores according to claim 1, wherein the guide body is connected in a non-rotatable and non-displaceable manner by means of a shrink fit connection on one side to a first cutting edge module bearing the cutting edge set and on the other side to a shank part which has a chucking section for centred coupling to a tool system module or tool holder of a tool system.

3. Machining tool for post-machining bores according to claim 1, wherein between the cutting edge set and the guide body there is a guide strip set comprising guide strip inserts, the guide strip inserts in each case being axially aligned with the cutting edges of the cutting edge set which is adjacent in a feed direction of the tool, the guide strip inserts having a nominal diameter which is essentially smaller than the nominal diameter of the cutting edge set which is adjacent in the feed direction by twice the size of a lubrication gap which is formed during use of the tool.

4. Machining tool for post-machining bores according to claim 1, wherein between the cutting edge set and the guide body there is a guide strip set, and wherein the amount by which the nominal diameter of the guide ribs and/or of the guide strip set is smaller than the nominal diameter D of the cutting edge set which is adjacent in the feed direction is in the range between 0.0002 and 0.0016×D.

5. Machining tool for post-machining bores according to claim 3, an axial length of the guide strip inserts of the guide strip set corresponds at least to an axial length of the cutting edge set which is adjacent in the feed direction.

6. Machining tool for post-machining bores according to claim 2, wherein the first cutting edge module on a side facing away from the guide body detachably bears a further cutting edge module with a cutting edge set which has a smaller nominal diameter than the nominal diameter of the cutting edge set which is adjacent the guide body in the feed direction.

7. Machining tool for post-machining bores according to claim 1, wherein each cutting edge set has six cutting edges distributed uniformly over the circumference.

8. Machining tool for post-machining bores according to claim 1, wherein between the cutting edge set and the guide body there is a guide strip set in the form of cutting inserts which are axially aligned with the cutting edges of the cutting edge set, the cutting inserts of the guide strip set and/or at least one of the at least one cutting edge set formed from polycrystalline diamond plated cutting plates.

9. Machining tool for post-machining bores according to claim 8, wherein the cutting plates have a thickness in the range between 0.75 and 1.7 mm, wherein the thickness of the polycrystalline diamond layer is approximately 0.5 mm.

10. Machining tool for post-machining bores according to claim 1, wherein between the cutting edge set and the guide body there is a guide strip set in the form of cutting inserts which are axially aligned with the cutting edges of the cutting edge set, the cutting inserts having cutting edges, the cutting edges of the cutting inserts of the guide strip set and/or at least one of the at least one cutting edge set being aligned in an axially parallel manner.

11. Machining tool for post-machining bores according to claim 1, wherein the machining tool further comprises an internal coolant/lubricant supply.

12. Machining tool for post-machining bores according to claim 11, wherein each cutting edge of each cutting edge set and/or each guide rib is assigned at least one opening of the coolant/lubricant supply.

13. Machining tool for post-machining bores according to claim 2, wherein the chucking section has a centring projection and a chucking flange situated perpendicularly on the axis of the centring projection for centred coupling to a tool holder of a tool system.

14. Machining tool for post-machining bores according to claim 3, wherein a secondary cutting edge free angle of the guide strip inserts of the guide strip set is approximately 0°.

15. Machining tool for post-machining bores according to claim 1, wherein the guide ribs in each case extend through a centring or wrap angle of at least 360°.

16. Machining tool for post-machining bores according to claim 1, wherein the number n of guide ribs is greater than or equal to 4.

17. Machining tool for post-machining bores according to claim 1, wherein the axial length of the guide body is in a range between 6 and 8×D, wherein D corresponds to the greatest nominal diameter of the tool.

18. Machining tool for post-machining bores according to claim 1, wherein the cutting edges of one of the cutting edge sets are formed from PCD (polycrystalline diamond) plated cutting plates.

19. Machining tool for post-machining bores according to claim 1, wherein the at least one of the cutting edge sets is aligned in an axially parallel manner.

20. Machining tool for post-machining bores according to claim 11, wherein each guide rib is assigned at least one opening of the coolant/lubricant supply.

21. Machining tool for post-machining bores according to claim 3, wherein the guide strip inserts are cylindrically ground.

22. Machining tool for post-machining bores according to claim 1, wherein between the cutting edge set and the guide body there is a guide strip set, and wherein the amount by which the nominal diameter of the guide ribs and/or of the guide strip set is smaller than the nominal diameter D of the cutting edge set which is adjacent in the feed direction is in the range between 0.0002 and 0.0005×D.

23. Machining tool for post-machining bores according to claim 13, wherein the chucking section has a hollow shank taper (HST).

24. Machining tool for post-machining bores according to claim 1, wherein between the cutting edge set and the guide body there is a guide strip set, and wherein the amount by which the nominal diameter of the guide ribs and/or of the guide strip set is smaller than the nominal diameter D of the cutting edge set which is adjacent in the feed direction is in the range between 0.0002 and 0.0005×D.

* * * * *